US000001067H

United States Statutory Invention Registration [19]

[11] Reg. Number: H1067

Eckerd

[43] Published: Jun. 2, 1992

[54] BREATHER VENT ASSEMBLY FORMED IN A SEALED DISK DRIVE HOUSING

[75] Inventor: Steve S. Eckerd, Oklahoma City, Okla.

[73] Assignee: Seagate Technology, Inc., Scotts Valley, Calif.

[21] Appl. No.: 359,731

[22] Filed: May 31, 1989

[51] Int. Cl.[5] ..... G11B 33/14

[52] U.S. Cl. ..... 360/97.02

[58] Field of Search ..... 360/97.02, 97.03, 97.04, 360/97.01; 220/373, 374, 371, 367

[56] References Cited

U.S. PATENT DOCUMENTS

| | | | |
|---|---|---|---|
| 3,921,849 | 11/1975 | Fernberg et al. | 220/373 X |
| 4,036,393 | 7/1977 | Neiman | 220/374 X |
| 4,092,687 | 5/1978 | Butsch | 360/97.02 |
| 4,265,303 | 5/1981 | Giurtino et al. | 165/166 |
| 4,282,554 | 8/1981 | Ho et al. | 360/97.02 |
| 4,308,041 | 12/1981 | Ellis et al. | 360/97.02 |
| 4,369,475 | 1/1983 | Ho et al. | 360/97.02 |
| 4,429,336 | 1/1984 | Berube et al. | 360/97.03 |
| 4,471,395 | 9/1984 | Beck et al. | 360/97.03 |
| 4,489,356 | 12/1984 | Farmer | 360/97.03 |
| 4,538,192 | 8/1985 | White et al. | 360/97.03 |
| 4,594,626 | 6/1986 | Frangesh | 360/97 |
| 4,599,670 | 7/1986 | Bolton | 360/137 |
| 4,620,248 | 10/1986 | Gitzendanner | 360/97 |
| 4,631,620 | 12/1986 | Oishi et al. | 360/133 |
| 4,633,349 | 12/1986 | Beck et al. | 360/98 |
| 4,636,891 | 1/1987 | Barski | 360/97.02 |
| 4,642,715 | 2/1987 | Ende | 360/97 |
| 4,751,594 | 6/1988 | Blanks | 360/97 |
| 4,863,499 | 9/1989 | Osendorf | 360/97.02 |
| 4,889,542 | 12/1989 | Hayes | 361/384 |

FOREIGN PATENT DOCUMENTS

| | | | |
|---|---|---|---|
| 57-105872 | 7/1982 | Japan | 360/133 |
| 59-33683 | 2/1984 | Japan | 360/97 |

*Primary Examiner*—Bernarr E. Gregory

*Attorney, Agent, or Firm*—Edward P. Heller, III; Bill D. McCarthy

[57] ABSTRACT

An improved disk drive breather vent for communicating air between the interior and the exterior of a sealed disk drive housing, comprising a vent passageway extending through the housing, a long, narrow groove disposed in an interior surface of the housing, and a sealing member adhesively bonded over the long, narrow groove to provide a long, narrow air passage which reduces diffusion of water vapor to and from the sealed disk drive housing as pressure equalization to ambient occurs.

15 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BREATHER VENT ASSEMBLY FORMED IN A SEALED DISK DRIVE HOUSING

BACKGROUND OF THE INVENTION

1. Field of the Invention.

The present invention relates to sealed disk drives for computers, and more particularly but not by way of limitation, to an improved breather vent for sealed disk drive housings.

2. Discussion.

U.S. Pat. No. 4,751,594, issued to Blanks, is the best known prior art background to the present invention, and the teaching of that patent is incorporated herein by reference.

U.S. Pat. No. 4,751,594 teaches the use of a long, narrow communication passage between the vent of a sealed disk drive and outside air for the purpose of achieving pressure equalization and for reducing water vapor communication through the passage. The Blanks patent recognizes that the humidity within a sealed disk drive housing must not be permitted to vary with that of the surrounding ambient atmosphere, and offers a useful solution to restricting water vapor ingress and egress in the housing.

The present invention provides a further refinement to that taught in U.S. Pat. No. 4,751,594.

SUMMARY OF INVENTION

The present invention provides an improved disk drive breather vent for a sealed disk drive housing. A vent comprising a vent passageway extending through a wall of the housing communicates with a long, narrow groove disposed in the interior surface of the housing wall. A sealant tape member is adhered to the interior wall to seal over the groove to form a long, narrow air passage communicating between the vent passageway and the interior of the housing. The sealant tape member secures a filter in position to filter air communicated through the air passage.

An object of the present invention is to provide an improved disk drive breather vent to reduce water vapor communication while achieving pressure equalization between the interior and exterior of a sealed disk drive housing.

Another object of the present invention, while achieving the above stated object, is to provide an improved disk drive breather vent which offers efficient and cost effective manufacturing.

Other objects, advantages and features of the present invention will become clear from the following detailed description when read in conjunction with the drawings and appended claims.

DESCRIPTION

For a better understanding of the present invention the prior art shown in FIGS. 1 and 1A will first be discussed. This is the disk drive breather vent taught in U.S. Pat. No. 4,751,594.

Figure 1:
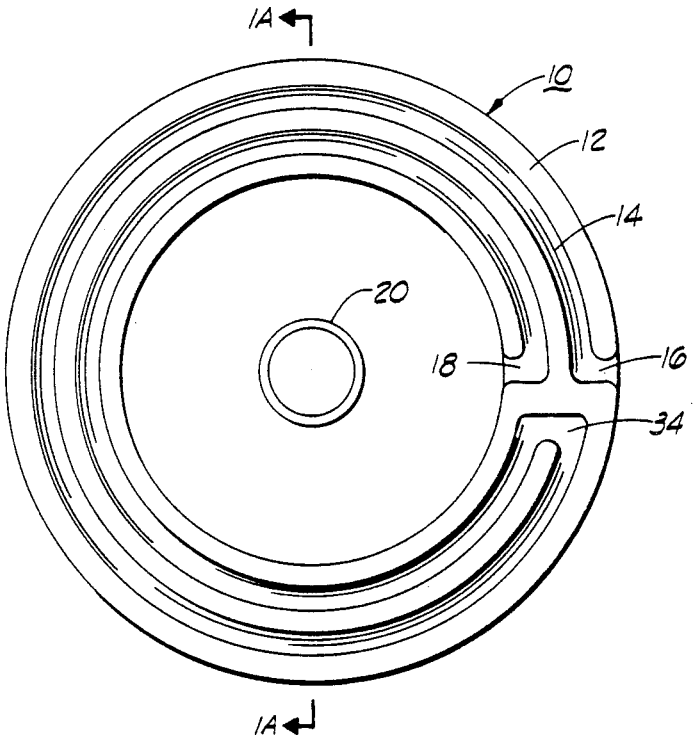
PRIOR ART FIG. 1
FIG. 1 is a plan view of the interior side of a vent cap portion of a prior art low diffusion disk drive breather vent.

FIG. 1 shows a plan view of a vent cap 10. The cap includes ridges 12 which form a hollow groove 14 communicating between an inlet 16 and an outlet 18. The groove 14 comprises a half cylinder as better shown in FIG. 1A. Extending from the center of the vent cap 10 is an attachment boss 20.

Figure 1A:
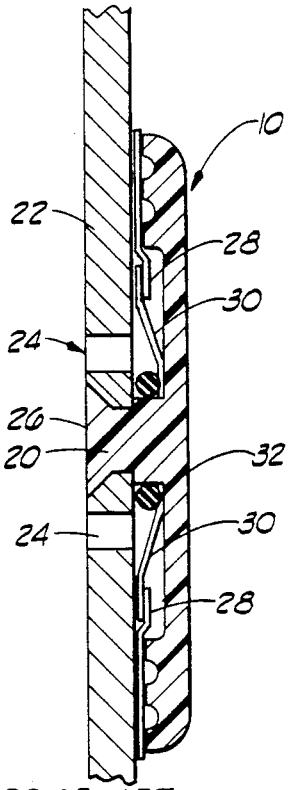
PRIOR ART FIG. 1A
FIG. 1A is a cross section of the vent cap along 1A—1A of FIG. 1.

FIG. 1A shows the vent cap 10 mounted on a top cover 22 of a sealed disk drive housing about the opening of a breather vent comprised of a plurality of inlet holes 24 which serve as a vent passageway. The boss 20 is inserted into a corresponding bore in the top cover 22 and heat staked to form an expanded end 26 which holds the vent cap 10 on the top cover 22. An airtight seal is maintained by a circular adhesive tape 28 which is adhesive on both sides. The vent cap 10 presses against the tape 28, forcing the tape 28 to press against the top cover 22. The tape 28 extends inwardly to cover an outer circumferential portion of a circular filter 30 which is held against the top cover 22. The inner circumferential portion of the filter 30 is held against the vent cap 10 at the boss 20 by an 0-ring 32. By this arrangement, outside air reaching the interior of the vent cap 10 passes through the filter 30 to reach the vent passageway 24.

That is, when mounted on the top cover 22, the ridges 12 of the vent cap 10 press against the tape 28, making an airtight seal therewith so that the only avenue for air to communicate between the outside air and the vent passageway 24 is through the inlet 16, the groove 14 and the outlet 18. The filter 30 filters dust out of the air which may enter the vent passageway 24 which communicates to the interior of a sealed disk drive (not shown).

As shown in FIG. 1, the groove 14 tracks the curvature of the circular cross sectional cap and doubles back on itself at an elbow 34. This provides for a long path relative to the narrow cross section of the path between the inlet 16 and the outlet 18. This long, narrow path provides for pressure equalization during disk drive operation while retarding and reducing water vapor ingress and egress relative to the interior of the sealed disk drive housing in which the disk drive is mounted.

The groove 14 is essentially a tube. It can be shown that the pressure differential through a tube is proportional to the length of the tube divided by the fourth power of its internal diameter (bore):

$$\Delta P \approx l/d^4$$

On the other hand, the diffusion mass flow rate of water vapor through dry air in a tube is proportional to the square of the internal diameter (bore) of the tube divided by its length:

$$\Delta Q \approx d^2/l$$

It is desirable to maintain both the pressure differential, $\Delta P$, and the mass flow rate of water vapor, $\Delta Q$, as low as possible. It is evident that for a given length of tube, doubling the diameter will reduce the pressure differential by a factor of sixteen but will increase the mass flow rate of water vapor by a factor of only four.

Conversely, lengthening the tube will increase the pressure differential and decrease the mass flow rate of water vapor in equal proportions. Therefore, for a given set of parameters associated with a given tube, if the length is increased by sixteen-fold and the diameter is doubled, the mass flow rate of water vapor by diffusion will be decreased by a factor of four while the pressure differential is unchanged.

It is evident that the tube should be as long as practical and have a diameter great enough as to not create a serious pressure differential. Further, it should have a bore large enough that the effects of surface tension and friction between air and water flowing in the tube and the surface of the tube are essentially laminar, and the tube should be long enough as to minimize the mass flow rate of water vapor through the tube. The tube must not be a capillary tube.

Assuming a maximum rate of air expulsion of 5 cubic inches per hour due to thermal excursions of the disk drive, to maintain a pressure differential smaller than 0.1 psi, a tube 10 inches in length should have a bore no smaller than 0.011 inch; a tube 20 inches in length should have a bore no smaller than 0.013 inch. Tubes with bores greater than minimum may be used, recognizing that a sacrifice of water vapor diffusion will occur.

Preferably, the vent cap 10 is 0.875 inch in diameter; the groove 14 is 0.030 inch in diameter; and when the ridges 12 are pressed against the tape 28, the resulting passage is approximately 0.0006 square inch in cross section. The length of the groove 14 is approximately 4.9 inches.

Figure 2:
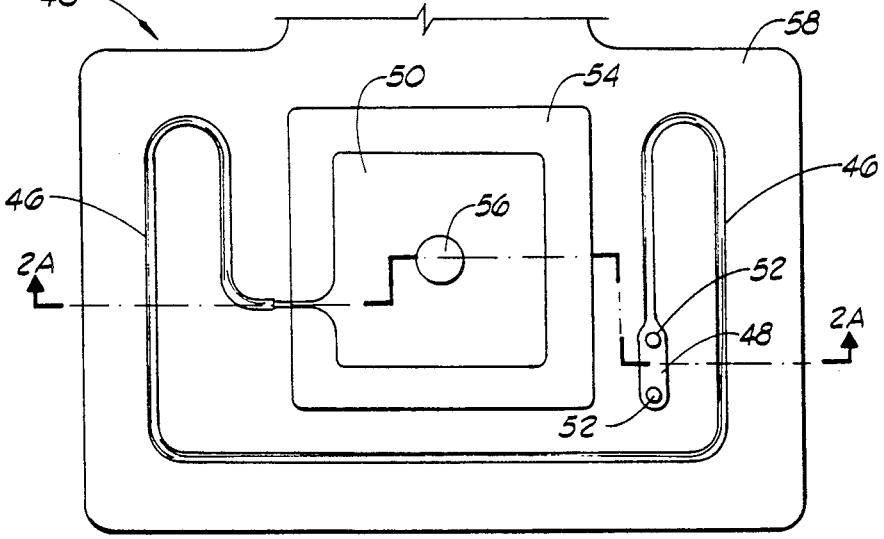
FIG. 2 is a plan view of the interior wall of a sealed disk drive housing illustrating the present invention.
Figure 3:
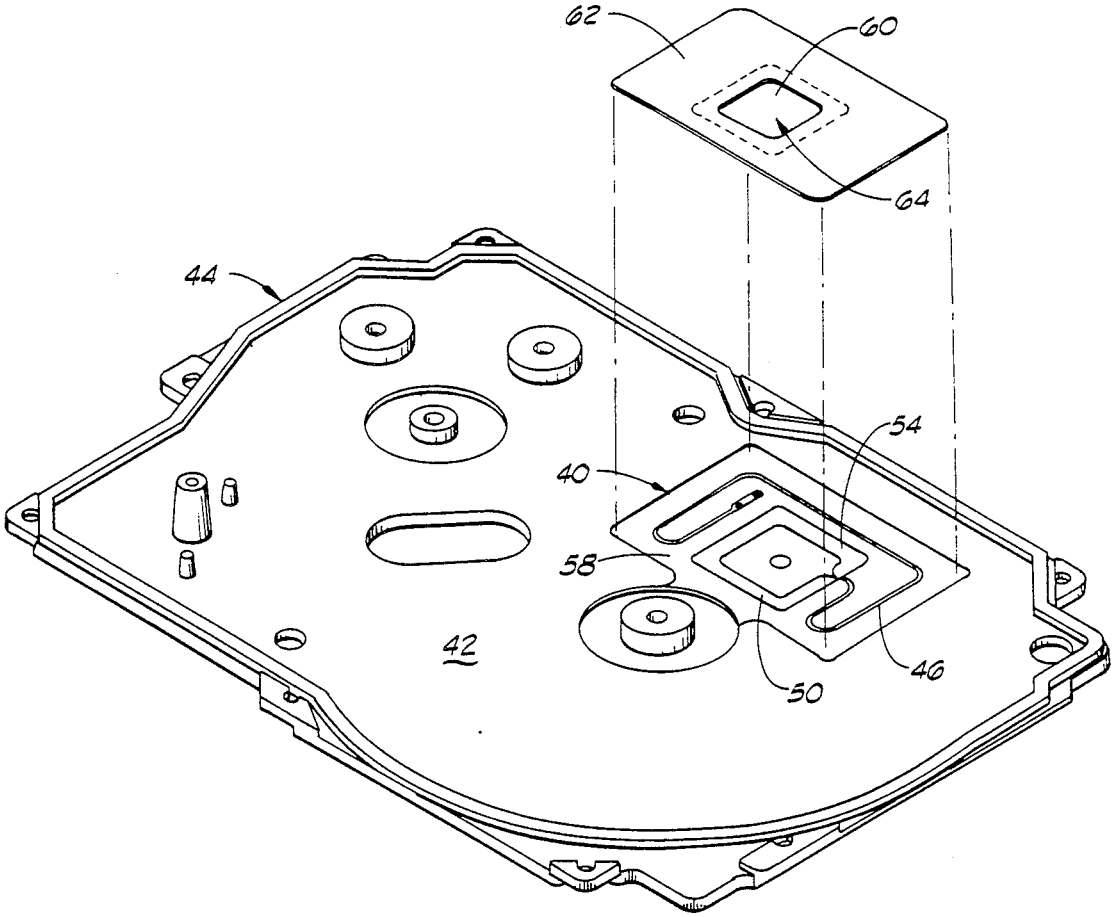
FIG. 3 is an isometric, exploded view showing the adhesive tape member and filter used in the present invention.

Turning now to FIG. 2, shown therein is a top plan view of an improved disk drive breather vent 40 formed in the interior surface of a housing wall 42 of a sealed disk drive housing 44 (partially shown in FIG. 3). The improved disk drive breather vent 40 comprises a long, narrow groove 46 which has a first groove end 48 and an enlarged second groove end 50. A pair of holes or vent passageway 52 extend through the housing wall 42 at the first groove end 48.

The housing wall 42 has a filter support recess 54, in its interior surface, which is disposed about the second groove end 50 of the long, narrow groove 46, the latter being grooved somewhat deeper than the filter support recess 54. Central to the second groove end 50 is a boss or filter support post 56, and disposed about the filter support recess 54 is a sealant support recess 58.

Figure 2A:
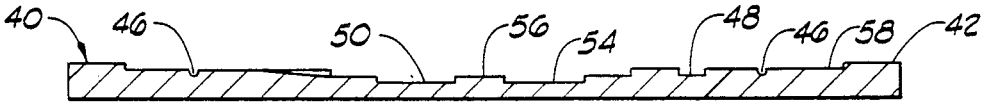
FIG. 2A is a cross section along 2A—2A in FIG. 2.

FIG. 2A shows a cross sectional profile of these various groove and recess areas described above. Preferably the depth of the groove 46 is about 0.020 inch, as is the filter support recess 54; below that, the second groove end 50 is another 0.015 inch depth. The width of the groove 46 is preferably about 0.031 inch.

Figure 4:
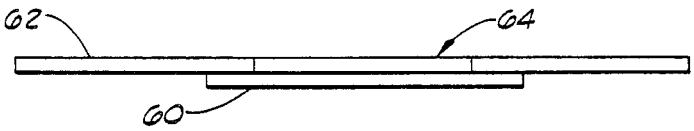
FIG. 4 is a side schematic view of the adhesive tape member and filter member.

A filter member 60 (FIGS. 3 and 4) is supported in the filter support recess 54; and the filter member 60 is preferably a substantially flat, planar member made of HEPA paper with spun bonded, polyester cover webs. The filter member 60 is preferably capable of operating at high relative humidity with a filter efficiency above 99% on 0.3 micron size thermally generated dioctyl phthalate (DOP) particles.

A sealing, adhesive tape member 62 is adhered to the housing wall 42 in the sealant support recess 58. The tape member 62 has an air communication window 64, and the tape member 62 is caused to overlay the filter member 60 so that the filter member 60 extends across and totally fills the air communication window 64 as shown.

Preferably the adhesive tape member 62 is a substantially clear polyester face stock about 0.002 inch thick with a layer of adhesive bonding material of a high strength acrylic of less than 0.001 inch thick. If desired, a siliconized liner can be used for easy peel presentation of the adhesive tape member 62 in multiples.

Once the tape member 62 is adhesively bonded to the interior surface of the housing wall 42 in the sealant support recess 58 over the filter member 60, which is in the filter support recess 54 over the filter support post 56, it will be appreciated that the tape member 60 sealingly covers the long, narrow groove 46, including the first groove end 48 thereof. This forms the groove 46 into a long, narrow air passage of the type discussed above, and all air communication (ingress and egress), including water vapor diffusion in and out of the interior of the sealed disk drive housing 44, must occur through the vent passageway 52 and the long, narrow air passage 46. As discussed above, the dimensions of the long, narrow passage 46 are selected so that it has a minimum cross section determined by the length of the passage and a predetermined minimum pressure differential across same at a predetermined airflow rate to maintain essentially laminar flow therethrough. The flow rate and groove dimensions provided hereinabove can again be referred to for an example of acceptable dimensions and parameters for the practice of the present invention.

It will be clear that the present invention is well adapted to carry out the objects and attain the advantages mentioned as well as those inherent therein. While a presently preferred embodiment of the invention has been described for purposes of this disclosure, numerous changes can be made which will readily suggest themselves to those skilled in the art and which are encompassed within the spirit of the invention disclosed and as defined in the appended claims.

What is claimed is:

1. A breather vent assembly for communicating air between an interior and an exterior of a disk drive housing wherein the disk drive housing includes a housing wall adapted to support the breather vent assembly so that air communication is provided between the interior and the exterior of the disk drive housing while reducing communication of water vapor between the interior and the exterior of the disk housing, the breather vent assembly comprising:

vent means for providing air communications between the interior and the exterior of the disk drive housing, the vent means comprising at least one vent passageway extending through the housing wall; and air passage means supported by the housing wall for reducing communication of water vapor through the vent passageway and into the interior of the disk drive housing, the air passage means comprising:

a long, narrow groove formed within one surface of the housing wall, the groove having a first end and a second end, the first end openly communicating with the vent passageway and the second end openly communicating with the interior of the disk drive housing;

sealant means supported by the housing wall for covering a portion of the groove and thereby form a long, narrow air passage communicating with the vent means and the interior of the disk drive housing, the air passageway having a length and minimum cross section sufficient to provide air-pressure equalization and reduced water vapor communication between the interior and the exterior of the housing, the minimum cross section of the air passage determined by the length of the air passage and a predetermined minimum pressure differential across the air passage at a predetermined air flow rate where laminar flow is essentially effected.

2. The breather vent assembly of claim 1 wherein the sealant means is an adhesive tape member is adhered to the housing wall and disposed to cover the long, narrow groove over substantially its full length, including the first end thereof communicating with the vent passageway, so that air communicating between the interior and the exterior of the housing is passed through the long, narrow air passage.

3. The breather vent assembly of claim 2 further comprising:

filter means supported by the housing wall for filtering air communicated between the interior and the exterior of the housing.

4. The breather vent assembly of claim 3 wherein the housing wall has a filter support recess disposed on an interior surface, wherein the long, narrow groove is disposed along the interior surface of the housing wall so that the second end of the long, narrow groove in communication with the interior of the housing communicates with the filter support recess, and wherein the filter means comprises:

a substantially planar filter member supported in the filter support recess.

5. The breather vent assembly of claim 4 wherein the adhesive tape member has an air communication window, and wherein the adhesive tape member is adhesively bonded to the filter member to dispose the filter member across the air communication window, the filter member being secured in the filter support recess by the adhesive tape member.

6. The breather vent assembly of claim 5 wherein the housing wall has a filter support post disposed in the filter support recess, the filter support post contacting the filter member so that the filter member is maintained across the air communication window of the adhesive tape member.

7. The breather vent assembly of claim 6 wherein the long, narrow groove includes at least one bend along its length so that the long, narrow groove doubles back on itself.

8. A breather vent assembly for communicating air between an interior and an exterior of a sealed disk drive housing wherein the disk drive housing includes a housing wall, the housing wall and the breather vent assembly cooperating to provide air communication between the interior and the exterior of the disk drive housing while reducing communications of water vapor therebetween, the breather vent assembly comprising:

vent means for defining at least one vent passageway in the housing wall;

a long narrow groove formed within one surface of the housing wall, the groove having a first end and a second end, the first end communicating with the vent passageway defined by the vent means;

sealant means connected to the housing wall for covering a portion of the groove and forming an air passage between the first end and the second end of the groove, the air passage having a minimum cross section determined by a length of the air passage so that a predetermined minimum pressure differential can be maintained across the air passage at a predetermined airflow rate to maintain essentially laminar flow through the air passage.

9. The breather vent assembly of claim 8 wherein the sealant means is an adhesive tape member adhered to an interior surface of the housing and disposed to cover a length of the long, narrow groove including only the first end thereof.

10. The breather vent assembly of claim 9 further comprising:

filter means supported over the second end of the long, narrow groove for filtering air communicated through the air passage to the sealed disk drive housing.

11. The breather vent assembly of claim 10 wherein the interior surface of the housing wall has a filter support recess in communication with the second end of the long, narrow groove, and wherein the filter means comprises a filter member supported in the filter support recess.

12. The breather vent assembly of claim 11 wherein the housing wall has a filter support post disposed in the filter support recess, the filter support post disposed to supportingly contact the filter member, and wherein the adhesive tape member has an air communication window, the adhesive tape member adhesively bonded to the filter member so that the filter member extends across the air communication window and is secured by the adhesive tape member in the filter support recess over the filter support post.

13. A breather vent assembly for a sealed disk drive apparatus in which a disk drive is supported in a sealed disk drive housing, the sealed disk drive housing having a housing wall, the housing wall supporting the breather vent assembly so that air communication is established between an interior and an exterior of the housing while reducing communication of water vapor therebetween, the breather vent assembly comprising:

a filter support recess formed in one surface of the housing wall;

at least one vent passageway extending through the housing wall and communicating between the exterior and the interior of the housing;

a long, narrow groove disposed in the surface of the housing wall, the groove having a first end and a second end, the first end communicating with the vent passageway, the second end communicating with the filter support recess;

a filter member supported in the filter support recess so as to be disposed in a covering position over the second end of the groove; and an adhesive member adhesively engaged with the housing wall so as to be disposed in a covering position relative to the groove and forming an air passage between the vent passageway and the filter support recess, the adhesive member having an air communication window formed in a portion thereof disposed over the filter member, the air passage having a minimum cross section determined by a length of the air passage and a predetermined minimum pressure differential between the interior and the exterior of the sealed disk drive housing at a predetermined laminar airflow rate.

14. The breather vent assembly of claim 13 wherein the housing wall has a filter support post disposed in the filter support recess, the filter support post contacting the filter member so that the filter member is maintained across the air communication window of the adhesive member.

15. The breather vent assembly of claim 14 wherein the long, narrow groove includes at least one bend along its length so that the air passage doubles back on itself.

* * * * *